May 13, 1969    J. J. JONES    3,443,830
WEED PULLER AND EXTRACTOR
Filed Sept. 15, 1967

INVENTOR.
JESSE J. JONES,
BY
Berman, Davidson & Berman
ATTORNEYS.

United States Patent Office 3,443,830
Patented May 13, 1969

3,443,830
WEED PULLER AND EXTRACTOR
Jesse J. Jones, R.R. 1, Box 110, La Grange, N.C. 28551
Filed Sept. 15, 1967, Ser. No. 668,097
Int. Cl. A01b *1/16*
U.S. Cl. 294—50.7                4 Claims

ABSTRACT OF THE DISCLOSURE

A weed puller and extractor comprising: an elongated handle; a bifurcated cylindrical head at one end of said handle; one leg of said bifurcation having one edge smoothly curved and its other edge serrated; the other leg having a smooth curved edge confronting the curved edge of said first leg, but terminating in a hook portion approaching said smooth edge of said first leg, the other edge of said second leg being smoothly curved and confronting the serrated edge of said first leg.

---

Every gardener is familiar with the problem of the occasional weed which pokes itself up in the middle of a densely foliated bed of flowers or shrubs. Such weeds occur in endless variety and differ as to the stalk strength and the tenacity of the root system. Merely clipping the weed back to the height of the bed is an exceedingly temporary remedy and the weed may be difficult to reach so far as any attempt at purely manual uprooting is concerned.

The present invention contemplates a long handled tool having an active head designed to be inserted quite selectively through a densely foliated bed and to grasp the particular offending weed and thereafter either to break the weed close to the ground or if the root system permits, completely extract the weed and withdraw it from thte bed.

The above is the primary object of the invention and it and other objects will be made clear from the following detailed description taken in connection with the annexed drawing, in which.

Figure 1:
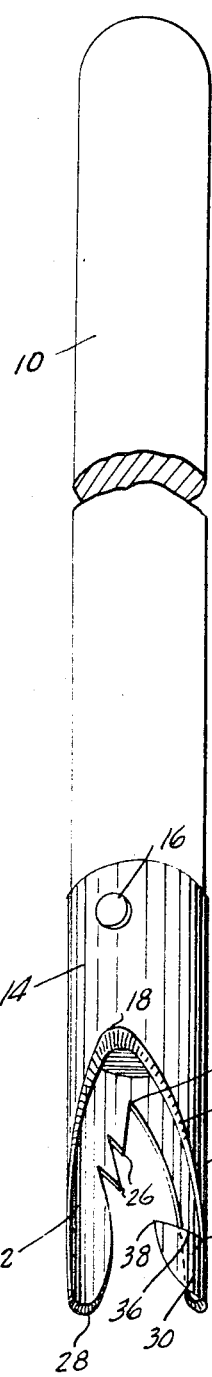
FIGURE 1 is a perspective view of the tool as a whole.
Figure 2:
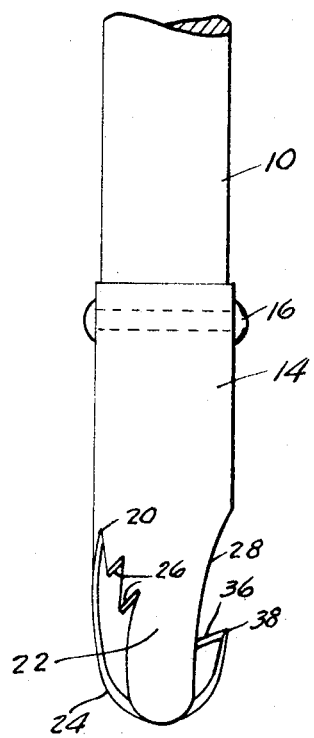
FIGURE 2 is an elevation taken from the left-hand side of FIGURE 1.
Figure 3:
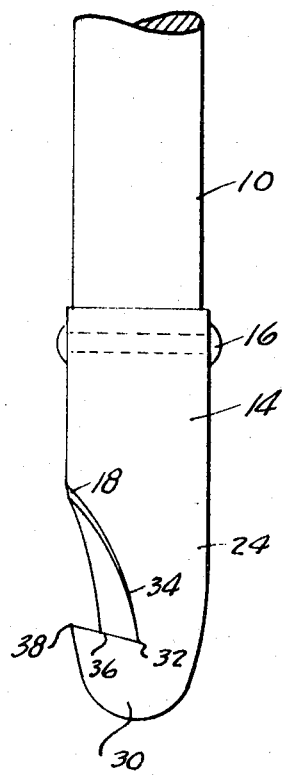
FIGURE 3 is an elevation from the right-hand side of FIGURE 1.
Figure 4:
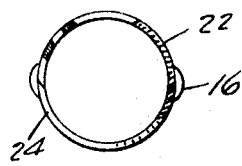
FIGURE 4 is a bottom plan view looking at the lower end of FIGURE 1.
Figure 4:
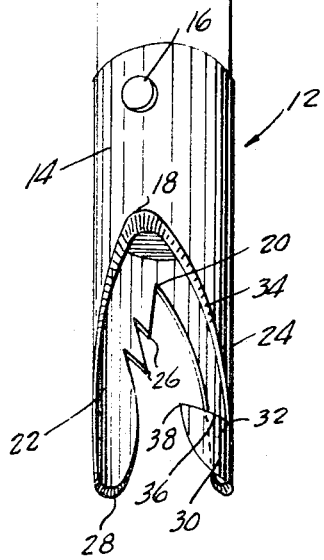

The device is made up of a handle portion 10 and an active head designated generally 12. The head 12 may be formed from a length of metal tubing or it may be stamped initially from flat sheet metal and bent to the form shown in FIGURE 1. In any case, the head 12 is made up of an upper cylindrical collar portion 14 that surrounds the handle portion 10 and is secured thereto by a rivet 16.

Below the overlap between the handle 10 and the collar 14 the head 12 is bifurcated as at 18 and 20 to provide opposed legs 22 and 24. Coming downward from the bifurcation 20 the leg 22 is providde with downwardly directed serration 26. Below the serrations 26 the leg 22 is smoothly curved back to the apex of the bifurcation 18. From the serrations 26 to the apex of the bifurcation 18 the edge 28 is inwardly beveled to provide the edge 28 at all points with a cutting edge on the interior of the head 12.

Starting at the bifurcation apex 18 the leg 24 proceeds in a smooth curve down to a hook portion 30 which it intersects at the point 32 to define between points 18 and 32 a cutting edge 34 beveled similarly to the edge 28.

From the point 32 the leg 24 extends in an edge 36 which is circular relative to the axis of the collar 14 and terminates in a point 38. From the point 38 the leg 24 curves smoothly back to the bifurcation 20 and in this portion is inwardly beveled the same as the edge 28. Axially, the legs 22 and 24 are coextensive.

In use, the tool is threaded through adjacent foliage until a major stem portion of the weed or weeds can be entrapped between the legs 22 and 24. A twisting movement then will engage the stem with the leg 24 between the points 32 and 38 which will enable the user to exert a very strong pulling force, reasonably close to the root system or if desired the legs 22 and 24 may be inserted into the ground so that the portion of the leg 24 between the points 32 and 38 may be engaged with the weed at approximately ground level. In either case, there is a firm solid engagement of the weed stem with the edge 36 and, depending on the condition of the soil, the weed will either be torn or severed at or near ground level or completely extracted.

While certain specific details of construction have been described herein, it is not intended to limit this invention to the precise details disclosed but only as set forth in the subjoined claims.

What is claimed is:

1. A head for a weed puller and extractor comprising: a cylindrical collar bifurcated to form opposed legs, one edge of one leg being serrated for a portion of its length to provide downwardly directed cutting edges, the confronting edge of the other leg being smooth, said confronting edge of said other leg having a hook portion intermediate its length, both of said legs below said serrations and said hook portion being smoothly curved back to the apices of said bifurcations and all of said edges except the hook portion being beveled to facilitate cutting.

2. A head as set forth in claim 1, in which said legs are coextensive.

3. A head as set forth in claim 1, including an elongated handle secured to said collar.

4. A head as set forth in claim 3, in which said legs are coextensive.

References Cited

UNITED STATES PATENTS 840,903    1/1907    Bucknall _____ 294—50.7
1,065,456  6/1913    Lowrey _____ 294—50.6

ANDRES H. NIELSEN, *Primary Examiner.*